UNITED STATES PATENT OFFICE.

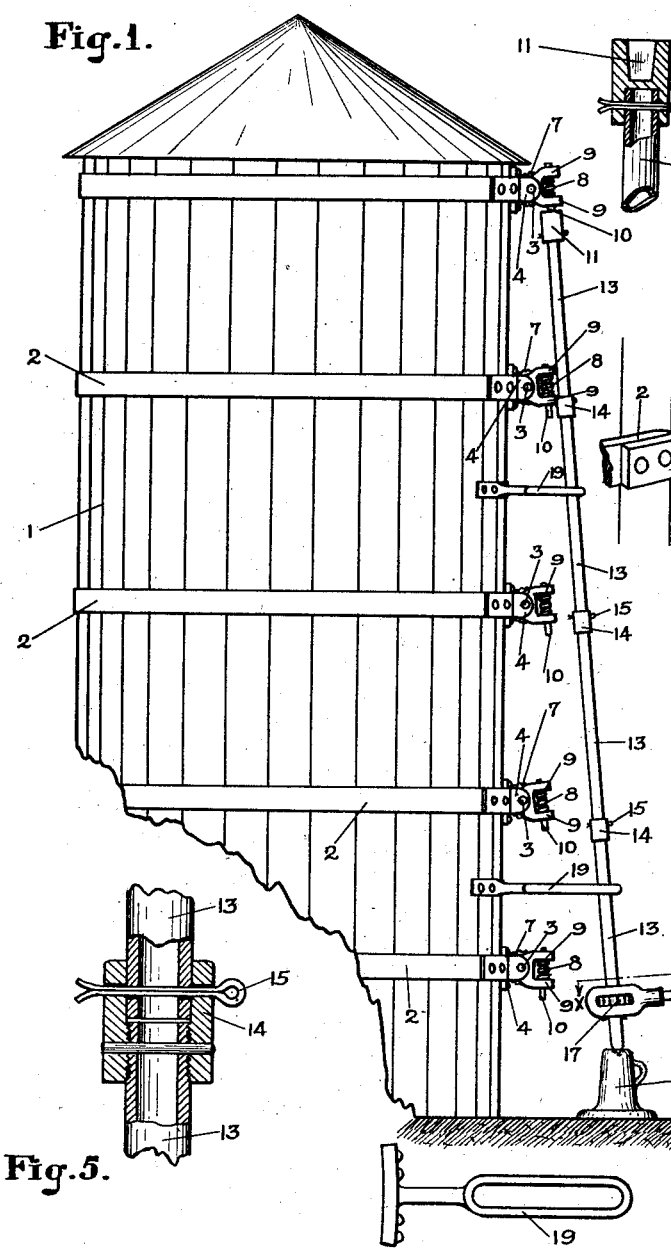

CHARLES H. COLSON, OF FORRESTON, ILLINOIS, ASSIGNOR OF ONE-THIRD TO BERNARD J. FRITZE AND ONE-THIRD TO WILLIAM B. FRITZE, OF FORRESTON, ILLINOIS.

BAND-TIGHTENER.

1,055,021.   Specification of Letters Patent.   Patented Mar. 4, 1913.

Application filed July 11, 1912. Serial No. 708,858.

*To all whom it may concern:*

Be it known that I, CHARLES H. COLSON, a citizen of the United States, and a resident of the city of Forreston, county of Ogle, and State of Illinois, have invented certain new and useful Improvements in Band-Tighteners, of which the following is a specification.

My invention relates to band tighteners and more particularly to devices of this character designed especially for use in the tightening of the bands of silos, water tanks or reservoirs, etc.

The object of my invention is the production of band tightening means of the character mentioned through the medium of which the bands of a silo or the like may be readily and expeditiously tightened from the position of the operator upon the ground.

A further object is the production of band tightening means as mentioned which will be durable and economical in construction and efficient in operation.

Other objects will appear hereinafter.

With these objects in view my invention consists in the combinations and arrangements of parts hereinafter described and claimed.

The invention will be best understood by reference to the accompanying drawings forming a part of this specification, and in which—

Figure 1 is a side elevation of a silo equipped with band tightening means embodying my invention; Fig. 2 is a detail sectional perspective view of a portion of the construction shown in Fig. 1, Fig. 3 is a detail sectional perspective view of a portion of the construction shown in Fig. 1, Fig. 4 is an enlarged sectional detail of the upper end portion of the rotatable operating shaft of the band connecting means, Fig. 5 is an enlarged sectional detail illustrating the detachable connection between the sections of said operating shaft, Fig. 6 is an enlarged section taken on substantially line *x—x* of Fig. 1, and Fig. 7 is a detail plan view of one of the guide or bearing members for said operating shaft.

Referring now to the drawing I have illustrated therein a silo 1 of conventional construction the lateral wall thereof being formed of staves which are bound together through the medium of a plurality of vertically spaced split bands 2 which encircle said staves. The adjacent ends of each of the bands 2 are adjustably connected through the medium of a screw 3, the opposite ends of said screw, which are oppositely screw threaded, engaging correspondingly threaded end pieces 4 which are rigidly secured to said band ends, as clearly shown in Fig. 2, the arrangement being such that, adjustment of said band ends to effect tightening or loosening of the band being secured by rotation of the screw 3. Each of the screws 3 is mounted in a bearing 5 which is secured upon the silo, laterally projecting portions 6 provided upon the base of said bearing serving to span the space between the ends of the band and as rubbing plates for the end pieces 4, as will be readily understood. Fixed to each of the screws 3 is a worm wheel 7 which meshes with a worm 8 rotatably mounted in the lug 9 formed upon the coöperating bearing 5, the arrangement being such, that rotation of the screws 3, in order to afford adjustment of the bands will be secured through rotation of said worms.

The lower ends 10 of worms 8 are squared for engagement with a socket 11 secured by means of a split pin 12 to the upper end of a rotatable shaft which is formed of a plurality of detachably connected sections 13. Said shaft is of a sectional construction as mentioned in order that the length thereof may be adjusted to accommodate the same for engagement with any one of the worms 8. The detachable connection between adjacent sections 13 consists of a collar 14 which is secured to the upper end of each of the sections 13, the lower ends of said sections being adapted to fit into the upper ends of said collars and be releasably secured therein through the medium of split pins 15 as clearly shown in Fig. 5. Rotation of said shaft 13 in order to effect band tightening as mentioned is secured through the medium of an oscillatory outwardly projecting handle 16 which is mounted at the lower end of the lowermost section 13 and operatively connected therewith by pawl-and-ratchet mechanism 17, as clearly shown in Fig. 6. The construction is such, as will be observed, that rotation of said shaft is obtained by oscillation of said handle.

Worms 8 are disposed at angles to allow the lower ends 10 to be directed in a line on the outside of the next lower worm gear connection so that the shaft 13 may miss the next lower worm gear connection in engaging the desired one, as will be observed. In engaging the lower squared end 10 of any one of the worms 8, it is first required to position the socket 11 directly under said end and then to move the shaft vertically to press said socket into engagement with said worm end. In order to hold the shaft in this elevated or operative position, a movable operating member 18 is provided which, when the shaft has been engaged with one of the worm ends, may be moved into position under the lower end of said shaft and thus serve to rotatably support the same as clearly shown in Fig. 1. Bearing members or guides 19, having elongated openings for engagement by the operating shaft, are provided to serve to reinforce or guide said shaft as will be readily understood. Said members 19 are permanently secured to the side of the silo and the openings therein are of such width as to permit of the passage therethrough of the shaft which is portable. The band connecting device will be arranged in vertical alinement so that the tightening of the various bands may be secured with ease and expedition.

With a construction as set forth it will be seen that the bands of a silo or other construction may be tightened by an operator positioned upon the ground, the necessity of mounting the silo in order to effect adjustment of the bands at the upper ends of the structure, which is now the case, being avoided. The construction is simple and economical and hence may be manufactured at a low cost.

While I have illustrated and described the preferred form of construction for carrying my invention into effect, this is capable of variation and modification without departing from the spirit of the invention. I, therefore, do not wish to be limited to the exact details of construction set forth, but desire to avail myself of such variations and modifications as come within the scope of the appended claims.

Having described my invention what I claim as new and desire to secure by Letters Patent is:

1. The combination with a structure, of a plurality of split bands; a connection adjustably connecting the ends of each of said split bands; and a sectional actuating means adapted to operate any one of said adjustable connections independently from a position at the base of said structure, substantially as described.

2. The combination with a structure, of a plurality of split bands; a connection adjustably connecting the ends of each of said split bands; and a manually operative sectional shaft adapted to operate any one of said adjustable connections, said shaft being formed so that one or more sections may be removed and the remaining sections operatively connected, substantially as described.

3. The combination with a structure having a plurality of vertically spaced split bands surrounding the same, of means adjustably connecting the ends of each of said bands; a manually rotatable sectional shaft adapted for coöperation with each of said connecting means for manually operating the latter to vary the distance between the band ends engaged thereby, the sections of said shaft being releasably connected for varying the length of said shaft to accommodate the same for operating any one of said connecting means by an operator stationed at the base of said structure, substantially as described.

4. The combination with a structure having a plurality of vertically spaced split bands surrounding the same, of means adjustably connecting the ends of each of said bands; gear connections on said adjustable means for adjusting the same a portable shaft adapted to releasably engage each of said gear connections for manually operating the latter to vary the distance between the band ends, said shaft being moved vertically into operative engagement with each of said gear connections; and means adapted for engagement with the lower end of the said shaft for temporarily supporting the same in operative position, substantially as described.

5. The combination with a structure, of a plurality of split bands spaced apart on said structure, ears on the ends of said split bands; a right hand and a left hand threaded screw threaded in the ears on the ends of each of said split bands; worm gear connections adapted to operate said right hand and left hand screws; and a manually operative sectional shaft on the side of said structure adapted to operate any one of said worm gear connections, said shaft being formed so that one or more sections may be removed and the remaining sections operatively connected, substantially as described.

In testimony whereof I have signed my name to this specification in the presence of two subscribing witnesses.

CHARLES H. COLSON.

Witnesses:
A. A. MEYERS,
ALBERTUS TIMMER.